US012579572B2

(12) United States Patent
Chiu et al.

(10) Patent No.: US 12,579,572 B2
(45) Date of Patent: Mar. 17, 2026

(54) FASHION SHOW MATCHMAKING VIRTUAL INCUBATOR SYSTEM BASED ON METAVERSE AND METHOD THEREOF

(71) Applicants: SQ Technology (Shanghai) Corporation, Shanghai (CN); Inventec Corporation, Taipei City (TW)

(72) Inventors: Chuan-Cheng Chiu, Taipei City (TW); Tao Yu, Shanghai (CN); Ta-Wei Yen, Shanghai (CN)

(73) Assignees: SQ Technology (Shanghai) Corporation, Shanghai (CN); Inventec Corporation, Taipei City (TW)

( * ) Notice: Subject to any disclaimer, the term of this patent is extended or adjusted under 35 U.S.C. 154(b) by 84 days.

(21) Appl. No.: 18/825,739

(22) Filed: Sep. 5, 2024

(65) Prior Publication Data

US 2025/0371607 A1 Dec. 4, 2025

(30) Foreign Application Priority Data

May 31, 2024 (CN) .......................... 202410704515.3

(51) Int. Cl.
*G06Q 30/0601* (2023.01)

(52) U.S. Cl.
CPC ............................... *G06Q 30/0643* (2013.01)

(58) Field of Classification Search
None
See application file for complete search history.

(56) References Cited

U.S. PATENT DOCUMENTS

| | | | | | |
|---|---|---|---|---|---|
| 8,924,261 | B2 * | 12/2014 | Stinchcomb | ....... | G06Q 30/0643 |
| | | | | | 705/26.1 |
| 2008/0154740 | A1 * | 6/2008 | Lee | ..................... | G06Q 30/0601 |
| | | | | | 705/26.1 |
| 2018/0124351 | A1 * | 5/2018 | Mattingly | ............. | G06F 1/3206 |
| 2018/0164349 | A1 * | 6/2018 | Yang | .................. | G01R 31/2856 |
| 2019/0156410 | A1 * | 5/2019 | Yankovich | ............. | G06Q 30/06 |
| 2021/0182946 | A1 * | 6/2021 | Tapia | ....................... | G06F 9/451 |
| 2022/0028174 | A1 * | 1/2022 | Zia | ..................... | G06Q 30/0641 |

(Continued)

OTHER PUBLICATIONS

Periyasamy et al (Rise of digital fashion and metaverse: Influence on sustainability) (Year: 2023).*

*Primary Examiner* — Mamon Obeid

(74) *Attorney, Agent, or Firm* — David R. Stevens; Stevens Law Group

(57) ABSTRACT

A fashion show matchmaking virtual incubator system based on metaverse, and a method thereof are disclosed. A matchmaking database host stores a fashion show item and a matchmaking message, and a server-end device performs a virtual incubator platform. When a user logs in a platform, the server-end device drives a display device to display the 3D virtual fashion display space and the fashion show item. When detecting that the user selects the show item and corresponding matchmaking message, the server-end device generates a design commission request for the user to edit, transmits the design commission request to an order taking device. After the order taking device transmits back a design result, the server-end device displays the design result. After the user confirms, the server-end device displays the purchasing message and generates an order message to perform purchase, thereby improving convenience and efficiency of matchmaking transactions.

10 Claims, 5 Drawing Sheets

(56) References Cited

U.S. PATENT DOCUMENTS

| | | | | |
|---|---|---|---|---|
| 2022/0222741 A1* | 7/2022 | Beauchamp | ........ | G06F 3/04815 |
| 2022/0406021 A1* | 12/2022 | Lebeau | .................... | H04R 3/00 |
| 2024/0111595 A1* | 4/2024 | Ying | ....................... | H04L 67/34 |
| 2024/0185310 A1* | 6/2024 | Nishino | ............... | G06Q 20/321 |
| 2024/0281781 A1* | 8/2024 | Agarwal | ................. | G06T 13/40 |
| 2024/0362874 A1* | 10/2024 | Assouline | .............. | A63F 13/35 |
| 2024/0394676 A1* | 11/2024 | Siddique | ............ | G06Q 30/0601 |
| 2025/0371607 A1* | 12/2025 | Chiu | ................. | G06Q 30/0643 |

* cited by examiner

Figure 2A:
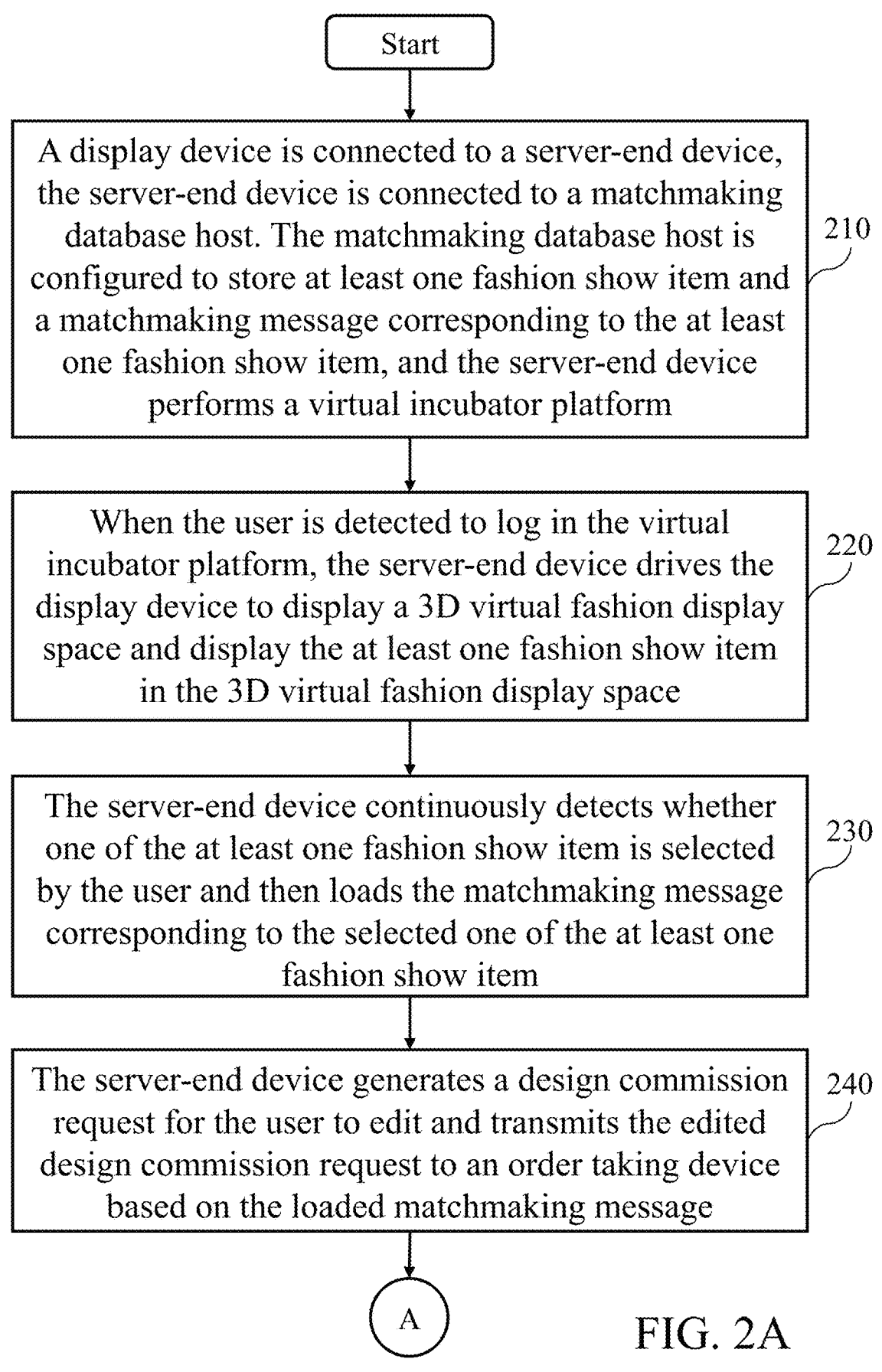

Start

A display device is connected to a server-end device, the server-end device is connected to a matchmaking database host. The matchmaking database host is configured to store at least one fashion show item and a matchmaking message corresponding to the at least one fashion show item, and the server-end device performs a virtual incubator platform

210

When the user is detected to log in the virtual incubator platform, the server-end device drives the display device to display a 3D virtual fashion display space and display the at least one fashion show item in the 3D virtual fashion display space

220

The server-end device continuously detects whether one of the at least one fashion show item is selected by the user and then loads the matchmaking message corresponding to the selected one of the at least one fashion show item

230

The server-end device generates a design commission request for the user to edit and transmits the edited design commission request to an order taking device based on the loaded matchmaking message

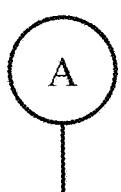

The server-end device receives a design result based on the design commission request from the order taking device and displays the design result in the 3D virtual fashion display space for exhibition through the display device                              250

When the user is detected to confirm acceptance of the design result, the server-end device drives the display device to display a purchasing message to guide the user to perform a purchase, and generates and transmits an order message to the order taking device based on the purchasing result, to complete the purchase                              260

End

FIG. 2B

FASHION SHOW MATCHMAKING VIRTUAL INCUBATOR SYSTEM BASED ON METAVERSE AND METHOD THEREOF

CROSS-REFERENCE TO RELATED APPLICATION

This application claims the benefit of Chinese Application Serial No. 202410704515.3, filed May 31, 2024, which is hereby incorporated herein by reference in its entirety.

BACKGROUND OF THE INVENTION

1. Field of the Invention

The present invention is related to a matchmaking incubation system and a method thereof, and more particularly to a fashion show matchmaking virtual incubator system based on metaverse and a method thereof.

2. Description of the Related Art

In recent years, with the vigorous development of the metaverse, various metaverse applications have sprung up. However, how to improve the usability of the metaverse has always been an issue that various manufacturers are eager to solve.

Generally speaking, the metaverse usually refers to a virtual world implemented with virtual reality or similar technology. In this virtual world, a user can create a virtual avatar to participate in various activities, such as games, social networking, or shopping. However, the existing metaverse lacks a function of matchmaking both ends of supply and demand, such as an incubator for new startups. For example, while the user is watching a fashion show in the virtual world, the existing metaverse is unable to matchmake the user with a startup or a designer and provide a matchmaking platform for design commission and purchase at one time. Therefore, the potential transactions between designers and users are limited in the existing metaverse. Therefore, the existing metaverse has the problem of poor convenience and poor efficiency in matchmaking transactions.

According to above-mentioned contents, what is needed is to develop an improved solution to solve the problem of poor convenience and poor efficiency in matchmaking transactions.

SUMMARY OF THE INVENTION

An objective of the present invention is to disclose a fashion show matchmaking virtual incubator system based on metaverse and a method thereof, to solve the problem of poor convenience and poor efficiency in matchmaking transactions.

To achieve the objective, the present invention discloses a fashion show matchmaking virtual incubator system based on metaverse; the fashion show matchmaking virtual incubator system include a display device, a matchmaking database host, and a server-end device. The display device is configured to display a 3D virtual fashion display space and display at least one fashion show item in the 3D virtual fashion display space. The matchmaking database host is configured to store the at least one fashion show item and a matchmaking message corresponding to the at least one fashion show item. The server-end device is connected to the display device and the matchmaking database host and configured to perform a virtual incubator platform. The server-end device includes a non-transitory computer-readable storage medium and a hardware processor. The non-transitory computer-readable storage medium is configured to store computer readable instructions. The hardware processor is electrically connected to the non-transitory computer-readable storage medium, and configured to execute the computer readable instructions to make the hardware processor execute: when a user is detected to log in the virtual incubator platform, driving the display device to display the 3D virtual fashion display space and the at least one fashion show item; continuously detecting whether one of the at least one fashion show item is selected by the user, and loading the matchmaking message corresponding to the selected one of the at least one fashion show item; generating a design commission request for the user to edit, and transmitting the design commission request to an order taking device based on the loaded matchmaking message; receiving a design result based on the design commission request from the order taking device, and displaying the design result in the 3D virtual fashion display space for exhibition through the display device; when the user is detected to confirm acceptance of the design result, driving the display device to display a purchasing message to guide the user to perform a purchase, and generating and transmitting an order message to the order taking device based on a purchasing result, to complete the purchase.

To achieve the objective, The present invention discloses a fashion show matchmaking virtual incubator method based on metaverse, and the fashion show matchmaking virtual incubator method includes steps of: connecting a display device and a server-end device, connecting the server-end device to a matchmaking database host, wherein the matchmaking database host is configured to store at least one fashion show item and a matchmaking message corresponding to the at least one fashion show item, and the server-end device performs a virtual incubator platform; when the user is detected to log in the virtual incubator platform, driving the display device to display a 3D virtual fashion display space and display the at least one fashion show item in the 3D virtual fashion display space, by the server-end device; continuously detecting whether one of the at least one fashion show item is selected by the user, loading the matchmaking message corresponding to the selected one of the at least one fashion show item, by the server-end device; generating a design commission request for the user to edit, and transmitting the design commission request to an order taking device based on the loaded matchmaking message, by the server-end device; receiving a design result based on the design commission request from the order taking device, and displaying the design result in the 3D virtual fashion display space for exhibition through the display device, by the server-end device; when the user is detected to confirm acceptance of the design result, driving the display device to display a purchasing message to guide the user to perform a purchase, and generating and transmitting an order message to the order taking device based on the purchasing result, to complete the purchase, by the server-end device.

According to the above-mentioned system and method of the present invention, the difference between the conventional technology and the present invention is that, in the present invention, the matchmaking database host stores the fashion show item and the matchmaking message, and the server-end device performs the virtual incubator platform. When a user logs in the virtual incubator platform, the server-end device drives the display device to display the 3D virtual fashion display space and the fashion show item. When detecting that the user selects the show item and corresponding matchmaking message, the server-end device generates the design commission request for the user to edit, transmits the design commission request to the order taking device. After the order taking device transmits back the design result, the server-end device displays the design result through the display device. After the user confirms, the server-end device displays the purchasing message and generates the order message to perform purchase.

Therefore, through the above-mentioned solution, the present invention is able to achieve the technical effect of improving convenience and efficiency of matchmaking transactions.

BRIEF DESCRIPTION OF THE DRAWINGS

The structure, operating principle and effects of the present invention will be described in detail by way of various embodiments which are illustrated in the accompanying drawings.

FIGS. 2A and 2B are flowcharts of a fashion show matchmaking virtual incubator method based on metaverse, according to the present invention.

DETAILED DESCRIPTION OF THE PREFERRED EMBODIMENTS

Figure 1:
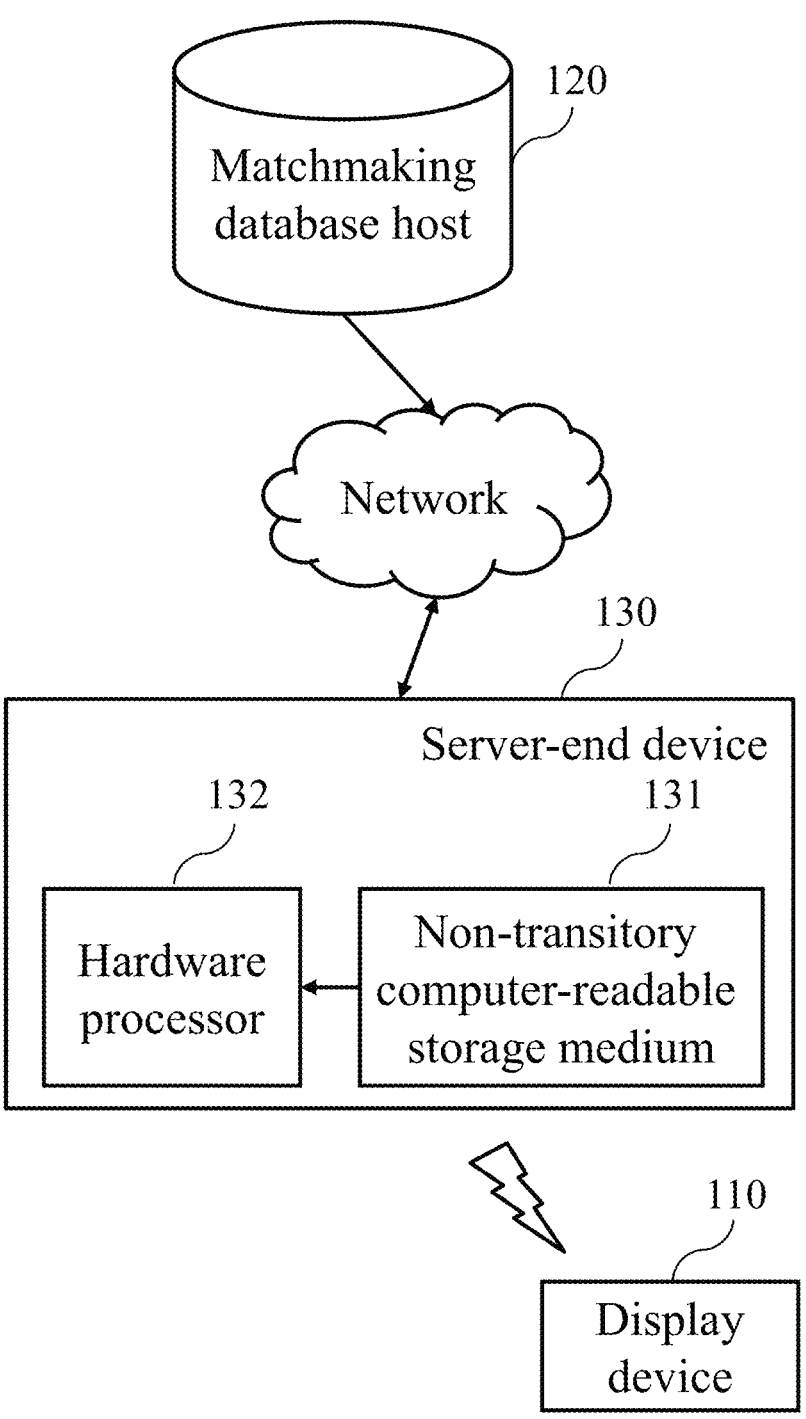
FIG. 1 is a block diagram of a fashion show matchmaking virtual incubator system based on metaverse, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions, and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include," and variations such as "comprises," "comprising," "includes," or "including," will be acknowledged to imply the inclusion of stated elements but not the exclusion of any other elements.

Please refer to FIG. 1, which is a block diagram of a fashion show matchmaking virtual incubator system based on metaverse, according to the present invention. As shown in FIG. 1, the system includes a display device 110, a matchmaking database host 120, and a server-end device 130. The display device 110 is configured to display a 3D virtual fashion display space, in which a fashion show item is displayed. In actual implementation, the 3D virtual fashion display space means a 3D virtual space, which simulates a 3D space in the real world. In this virtual space, an object has a length, a width and a height and can be moved, rotated, and interacted with. In fact, the virtual space is created based on computer graphics and virtual reality technology, so that a user can have immersive experience in this three-dimensional space and interact with it through a virtual reality device. In the present invention, the 3D virtual fashion display space is a virtual space used to display the 3D modeled clothes or apparel and corresponding related design objects. In addition, in actual implementation, the display device 110 can be implemented by head-mount display (HMD) device, a bare view 3D display device or the like; however, the type of the display 110 in the present invention is not limited to above-mentioned examples, and any 3D display device can be involved in the application field of the present invention.

The matchmaking database host 120 is configured to store a fashion show item and a matchmaking message corresponding to the fashion show item. In actual implementation, the fashion show item means the clothes or apparel, and related design object displayed in the 3D virtual fashion display space. In an embodiment, the design object can be, for example, jewelry, accessories or the like. In addition, the matchmaking message can include an introduction message (such as a company profile or a personal profile) and a contact message (such as an email, a telephone number, an instant messaging software account) of at least one of a fashion designer, a manufacturer and an agency included in a virtual incubator platform.

The server-end device 130 is connected to the display device 110 and the matchmaking database host 120 and configured to perform the virtual incubator platform. The server-end device 130 includes a non-transitory computer-readable storage medium 131 and a hardware processor 132. The non-transitory computer-readable storage medium 131 stores computer readable instructions. In actual implementation, the non-transitory computer-readable storage medium 121 may include a hard disk, an optical disk, a flash memory, or the like. The server-end device 130 executes the computer readable instructions. The computer readable instructions can be assembly language instructions, instruction-set-structure instructions, machine instructions, machine-related Instructions, micro-instructions, firmware instructions, or source codes or object codes written in any combination of one or more programming languages. The programming language includes object-oriented programming languages, such as: Common Lisp, Python, C++, Objective-C, Smalltalk, Delphi, Java, Swift, C#, Perl, Ruby, or PHP; the programming language can include regular procedural programming languages, such as C language or similar programming languages. In actual implementation, the server-end device 130 can be implemented by a rack server, a tower server, a cloud server, a cluster server, or the like.

The hardware processor 132 is electrically connected to the non-transitory computer-readable storage medium 131, and configured to execute the computer readable instructions, so that when a user is detected to log in the virtual incubator platform, the hardware processor 132 drives the display device 110 to display the 3D virtual fashion display space and the at least one fashion show item, and continuously detects whether one of the at least one fashion show item is selected by the user, loads the matchmaking message corresponding to the selected one of the at least one fashion show item, generates a design commission request for the user to edit, transmits the edited design commission request to an order taking device based on the loaded matchmaking message, receives a design result based on the design commission request from the order taking device, and displays the design result in the 3D virtual fashion display space for exhibition through the display device. When the user is detected to confirm acceptance of the design result, the hardware processor 132 drives the display device 110 to display a purchasing message to guide the user to perform a purchase, and generates and transmits an order message to the order taking device based on a purchasing result, to complete the purchase. In actual implementation, the design commission request can be transmitted to the order taking device through at least one of an email, an SMS, an instant messaging and an application programming interface, the order taking device includes at least one of a desktop computer, a tablet computer, a notebook computer, a server, and a smartphone. In addition, when the design result is a 2D design drawing, the hardware processor executes a 3D model establishment to convert the 2D design drawing into the fashion show item displayed in the 3D virtual fashion display space. In addition, the hardware processor can detect the schedule message from the order taking device, the schedule message comprising a delivery date. When the hardware processor detects that the delivery date (from now) exceeds a preset number of days, the user is permitted to generate the order message or cancel the order message. In other words, after the delivery date exceeds the preset number of days, the user can still decide to generate the order message for purchase or cancel the order to cancel purchase. In practice, the 2D design drawing can be converted into the fashion show item displayed in the 3D virtual fashion display space, the 3D model establishment can be implemented by deep learning technology, convolution neural network (CNN), or the like technique.

It is particularly to be noted that, in actual implementation, the present invention can be implemented fully or partly based on hardware, for example, one or more module of the system can be implemented by hardware processor such as integrated circuit chip, system on chip (SOC), a complex programmable logic device (CPLD), or a field programmable gate array (FPGA). The non-transitory computer-readable storage medium records computer readable instructions, and the hardware processor can execute the computer readable instructions to implement concepts of the present invention. The non-transitory computer-readable storage medium can be a tangible apparatus for holding and storing the instructions executable of an instruction executing apparatus. The non-transitory computer-readable storage medium can be, but not limited to, electronic storage apparatus, magnetic storage apparatus, optical storage apparatus, electromagnetic storage apparatus, semiconductor storage apparatus, or any appropriate combination thereof. More particularly, the non-transitory computer-readable storage medium can include a hard disk, an RAM memory, a read-only-memory, a flash memory, an optical disk, a floppy disc, or any appropriate combination thereof, but this exemplary list is not an exhaustive list. The non-transitory computer-readable storage medium is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable instruction can be downloaded from the non-transitory computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub, and/or gateway. The network card or network interface of each calculating/processing apparatus can receive the computer readable instructions from network and forward the computer readable program instruction to store in non-transitory computer-readable storage medium of each calculating/processing apparatus.

Please refer to FIGS. 2A and 2B, FIGS. 2A and 2B are flowcharts of a fashion show matchmaking virtual incubator method based on metaverse, according to the present invention. As shown in FIGS. 2A and 2B, the method includes the following steps. In a step 210, a display device 110 is connected to a server-end device 130, the server-end device 130 is connected to a matchmaking database host 120. The matchmaking database host 120 is configured to store at least one fashion show item and a matchmaking message corresponding to the at least one fashion show item, and the server-end device 130 performs a virtual incubator platform. In a step 220, when the user is detected to log in the virtual incubator platform, the server-end device 130 drives the display device 110 to display a 3D virtual fashion display space and display the at least one fashion show item in the 3D virtual fashion display space. In a step 230, the server-end device 130 continuously detects whether one of the at least one fashion show item is selected by the user and then loads the matchmaking message corresponding to the selected one of the at least one fashion show item. In a step 240, the server-end device 130 generates a design commission request for the user to edit and transmits the edited design commission request to an order taking device based on the loaded matchmaking message. In a step 250, the server-end device 130 receives a design result based on the design commission request from the order taking device and displays the design result in the 3D virtual fashion display space for exhibition through the display device 110. In a step 260, when the user is detected to confirm acceptance of the design result, the server-end device 130 drives the display device 110 to display a purchasing message to guide the user to perform a purchase, and generates and transmits an order message to the order taking device based on the purchasing result, to complete the purchase. Through the above-mentioned steps 210~260, the matchmaking database host 120 stores the fashion show item and the matchmaking message, and the server-end device 130 performs the virtual incubator platform. When a user logs in the virtual incubator platform, the server-end device 130 drives the display device 110 to display the 3D virtual fashion display space and the fashion show item. When detecting that the user selects the show item and corresponding matchmaking message, the server-end device 130 generates the design commission request for the user to edit, transmits the design commission request to the order taking device. After the order taking device transmits back the design result, the server-end device 130 displays the design result through the display device 110. After the user confirms, the server-end device 130 displays the purchasing message and generates the order message to perform purchase.

Figure 3:
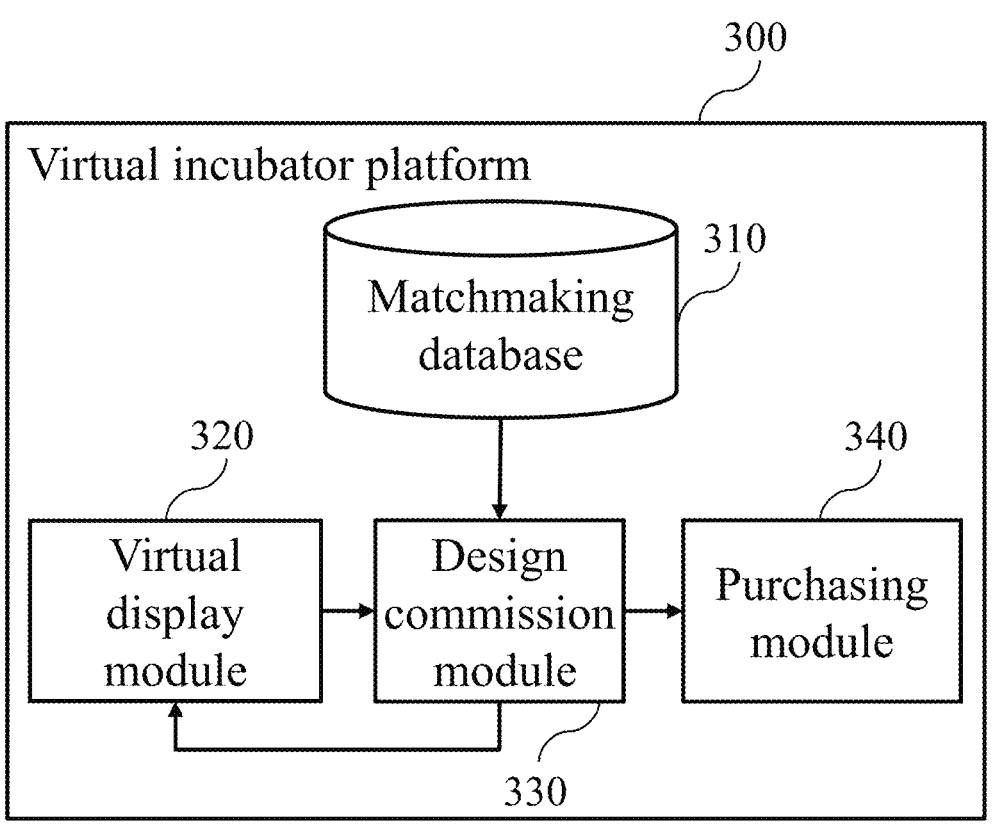
FIG. 3 is a schematic view of a virtual incubator platform, according to an application of the present invention.

The embodiment of the present invention will be illustrated in the following paragraphs with reference to FIG. 3 and FIG. 4. FIG. 3 is a schematic view of a virtual incubator platform, according to an application of the present invention. In actual implementation, besides the blocks shown in FIG. 1, the server-end device 130 of FIG. 1 can also execute a virtual incubator platform 300 including a matchmaking database 310, a virtual display module 320, a design commission module 330, and a purchasing module 340. The matchmaking database 310 integrates the database of the matchmaking database host 120 into the server-end device 130. When the virtual display module 320 detects that the user logs in the virtual incubator platform 300, the virtual display module 320 drives the display device 110 to display the 3D virtual fashion display space and the fashion show item, continuously detects whether the displayed fashion show item is selected by the user, and loads the matchmaking message corresponding to the selected fashion show item. The design commission module 330 is connected to the matchmaking database 310 and the virtual display module 320, and configured to generate a design commission request for the user to edit, transmit the edited design commission request to an external order taking device based on the loaded matchmaking message, receive a design result based on the design commission request from the order taking device, and display the design result in the 3D virtual fashion display space for exhibition through the display device 110. After the purchasing module 340 detects that the user confirms acceptance of the design result, the purchasing module 340 drives the display device 110 to display a purchasing message to guide the user to perform a purchase and generates and transmit an order message to the order taking device based on the purchasing result, to complete the purchase. In other words, the present invention can be implemented by modularized manner, and the matchmaking database 310 can be directly disposed in the server-end device 130, thereby reducing architecture complexity and hardware cost.

Figure 4:
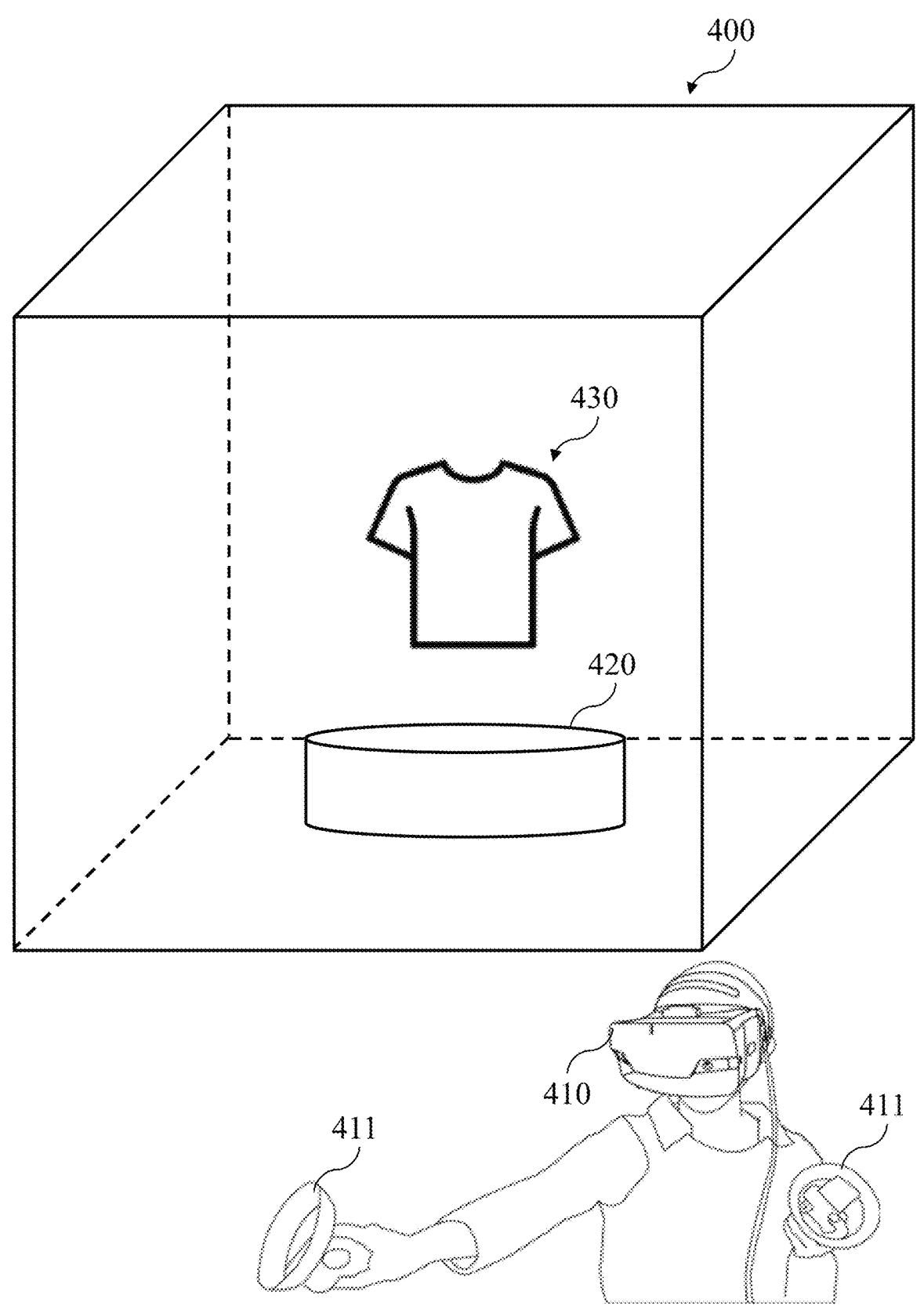
FIG. 4 is a schematic view of performing design commission and purchase in the 3D virtual fashion display space, according to an application of the present invention.

Please refer to FIG. 4, FIG. 4 is a schematic view of performing design commission and purchase in the 3D virtual fashion display space, according to an application of the present invention. In actual implementation, when a user wears a display device 410, the user can log in the virtual incubator platform executed by the server-end device 130 by operating of a controller 411; the server-end device 130 drives the display device 410 to display a 3D virtual fashion display space 400 for the user to browse, and display a fashion show item in the 3D virtual fashion display space 400. For example, as shown in FIG. 4, a display stage 420 and a fashion show item (such as clothes 430) are displayed in the 3D virtual fashion display space 400. The user can switch viewing angles to browse the clothes 430 through the operation of the controller 411, or switch different fashion show items such as pants, skirts, coats, hats, accessories. In actual implementation, to present the fashion show item more perfectly, the fashion show item can be worn on a virtual model catwalking on the display stage 420. Then, when the user selects the favorite fashion show item through the controller 411, the server-end device 130 loads a matchmaking message corresponding to the selected fashion show item from the matchmaking database host 120, for example, the matchmaking message can include introduction and an email of designer. Next, the server-end device 130 generates a design commission request for the user to edit and transmits the edited design commission request to an order taking device, which works for a designer or a company, based on the loaded matchmaking message. After completing a design result based on the design commission request, the designer or the company transmits the design result to the server-end device 130 through the order taking device, and the design result is displayed in the 3D virtual fashion display space 400 for exhibition through the display device 410. After the server-end device 130 detects that the user confirms acceptance of the design result through the controller 411, the server-end device 130 drives the display device 410 to display a purchasing message to guide the user to perform a purchase, generates an order message based on the purchasing result, and transmits the order message to the order taking device, so that a one-stop process from completing the entrusted design to purchasing can be completed, and it effectively improves the convenience and efficiency of matchmaking transactions. In actual implementation, when the design result is a 2D design drawing, the server-end device 130 can also execute 3D model establishment to convert the 2D design result into 3D design result displayed in the 3D virtual fashion display space 400.

According to above-mentioned contents, the difference between the present invention and the conventional technology is that, in the present invention, the matchmaking database host stores the fashion show item and the matchmaking message, and the server-end device performs the virtual incubator platform. When a user logs in the virtual incubator platform, the server-end device drives the display device to display the 3D virtual fashion display space and the fashion show item. When detecting that the user selects the show item and corresponding matchmaking message, the server-end device generates the design commission request for the user to edit, transmits the design commission request to the order taking device. After the order taking device transmits back the design result, the server-end device displays the design result through the display device. After the user confirms, the server-end device displays the purchasing message and generates the order message to perform purchase. Therefore, the above-mentioned solution of the present invention can solve the conventional problem and achieve the technical effect of improving convenience and efficiency of matchmaking transactions.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A fashion show matchmaking virtual incubator system based on metaverse, and the fashion show matchmaking virtual incubator system comprising:

a display device, configured to display a 3D virtual fashion display space and display at least one fashion show item in the 3D virtual fashion display space;

a matchmaking database host, configured to store the at least one fashion show item and a matchmaking message corresponding to the at least one fashion show item; and a server-end device, connected to the display device and the matchmaking database host, and configured to perform a virtual incubator platform, wherein the server-end device comprises:

a non-transitory computer-readable storage medium, configured to store computer readable instructions; and a hardware processor, electrically connected to the non-transitory computer-readable storage medium, and configured to execute the computer readable instructions to make the hardware processor execute:

when a user is detected to log in the virtual incubator platform, driving the display device to display the 3D virtual fashion display space and the at least one fashion show item;

continuously detecting whether one of the at least one fashion show item is selected by the user, and loading the matchmaking message corresponding to the selected one of the at least one fashion show item;

generating a design commission request for the user to edit, and transmitting the edited design commission request to an order taking device based on the loaded matchmaking message;

receiving a design result based on the design commission request from the order taking device, and displaying the design result in the 3D virtual fashion display space for exhibition through the display device; and when the user is detected to confirm acceptance of the design result, driving the display device to display a purchasing message to guide the user to perform a purchase, and generating and transmitting an order message to the order taking device based on a purchasing result, to complete the purchase.

2. The fashion show matchmaking virtual incubator system based on metaverse according to claim 1, wherein the matchmaking message comprises an introduction message and a contact message of at least one of a fashion designer, a manufacturer and an agency included in the virtual incubator platform.

3. The fashion show matchmaking virtual incubator system based on metaverse according to claim 1, wherein the design commission request is transmitted to the order taking device through at least one of an email, an SMS, an instant messaging and an application programming interface (API), and the order taking device comprises at least one of a desktop computer, a tablet computer, a notebook computer, a server, and a smartphone.

4. The fashion show matchmaking virtual incubator system based on metaverse according to claim 1, wherein when the design result is a 2D design drawing, the hardware processor executes a 3D model establishment to convert the 2D design drawing into the fashion show item displayed in the 3D virtual fashion display space.

5. The fashion show matchmaking virtual incubator system based on metaverse according to claim 1, wherein the hardware processor detects a schedule message from the order taking device, the schedule message comprising a delivery date, and when the hardware processor detects that the delivery date exceeds a preset number of days, the user is permitted to generate the order message or cancel the order message.

6. A fashion show matchmaking virtual incubator method based on metaverse, and the fashion show matchmaking virtual incubator method comprising:

connecting a display device and a server-end device, connecting the server-end device to a matchmaking database host, wherein the matchmaking database host is configured to store at least one fashion show item and a matchmaking message corresponding to the at least one fashion show item, and the server-end device performs a virtual incubator platform;

when the user is detected to log in the virtual incubator platform, driving the display device to display a 3D virtual fashion display space and display the at least one fashion show item in the 3D virtual fashion display space, by the server-end device;

continuously detecting whether one of the at least one fashion show item is selected by the user, loading the matchmaking message corresponding to the selected one of the at least one fashion show item, by the server-end device;

generating a design commission request for the user to edit, and transmitting the edited design commission request to an order taking device based on the loaded matchmaking message, by the server-end device;

receiving a design result based on the design commission request from the order taking device, and displaying the design result in the 3D virtual fashion display space for exhibition through the display device, by the server-end device; and when the user is detected to confirm acceptance of the design result, driving the display device to display a purchasing message to guide the user to perform a purchase, and generating and transmitting an order message to the order taking device based on the purchasing result, to complete the purchase, by the server-end device.

7. The fashion show matchmaking virtual incubator method based on metaverse according to claim 6, wherein the matchmaking message comprises an introduction message and a contact message of at least one of a fashion designer, a manufacturer and an agency included in the virtual incubator platform.

8. The fashion show matchmaking virtual incubator method based on metaverse according to claim 6, wherein the design commission request is transmitted to the order taking device through at least one of an email, an SMS, an instant messaging and an application programming interface (API), and the order taking device comprises at least one of a desktop computer, a tablet computer, a notebook computer, a server, and a smartphone.

9. The fashion show matchmaking virtual incubator method based on metaverse according to claim 6, wherein when the design result is a 2D design drawing, the hardware processor executes 3D model establishment to convert the 2D design drawing into the fashion show item displayed in the 3D virtual fashion display space.

10. The fashion show matchmaking virtual incubator method based on metaverse according to claim 6, wherein the hardware processor detects a schedule message from the order taking device, the schedule message comprising a delivery date, and when the hardware processor detects that the delivery date exceeds a preset number of days, the user is permitted to generate the order message or cancel the order message.

* * * * *